July 6, 1965

F. K. LEVIN 3,193,045

FATHOMER

Filed Sept. 8, 1959

Franklyn K. Levin    Inventor

By John D. Gassett   Attorney

July 6, 1965

F. K. LEVIN 3,193,045

FATHOMER

Filed Sept. 8, 1959

Franklyn K. Levin  Inventor

By John D. Gassett  Attorney

United States Patent Office 3,193,045
Patented July 6, 1965

3,193,045
FATHOMER
Franklyn K. Levin, Tulsa, Okla., assignor, by mesne assignments, to Esso Production Research Company, Houston, Tex., a corporation of Delaware
Filed Sept. 8, 1959, Ser. No. 838,551
8 Claims. (Cl. 181—.5)

This invention relates to a system for obtaining information on structures immediately below the bottom of water of water-covered areas, and especially in areas in which the structure immediately below the water has a velocity of sound which is much greater or much less than the velocity of sound in the water.

Fathomers, or depth sounding systems utilizing recording indicators are well known and consist generally of a source of sonic vibrations which are periodically applied to a sonic transducer in contact with the water body whose depth is to be measured. Sonic vibrations transmitted into the water body are directed toward the bottom thereof and produce echo reflections which return to the transducer and are picked up. The echo signals are fed through a suitable amplifying system and a detecting system which may have a visual indicator. These conventional systems are usually adequate for measuring the depth of the water.

However, in some instances it is desired to know the thicknesses of structures below the body of water. For example it is quite frequently desired to know the depth of sediment deposits on the bottom of a lake. These deposits or "bottom beds" lie immediately beneath the bottom of the body of water. Quite frequently some of these "bottom beds" contain free gas, that is gas that is not dissolved in the sediments but rather is there in the form of bubbles. Known fathomers are ineffective to determine the thickness of such gas-filled "bottom beds" or beds below gas-filled "bottom beds." The high frequencies are attenuated and low frequencies are reflected nearly completely; thus neither high nor low frequency fathomers can map depths below the bottom of the body of water.

The present invention discloses a system for determining or detecting the reflections from the interfaces of beds or structures below the bottom of the water thus permitting such beds to be mapped. It has been found that low frequencies that do penetrate the bottom bed of the body of water are not attenuated greatly; however recovered reflections from beds below the bottom are hidden in the "ringing" set up by sound bouncing between the surface of the water and the bottom thereof. In a preferred embodiment this ringing is eliminated by a time domain filter acting on the detected signal. The signals remaining, after the detected signal passes through the time domain filter, are reflections of low frequency energy which penetrated the bottom beds below the body of water. These reflections thus recovered can be displayed so as to indicate the reflected events beneath the bottom of the body of water.

A fuller understanding of the invention may be had from the following description taken in conjunction with the drawing in which.

Figure 1:
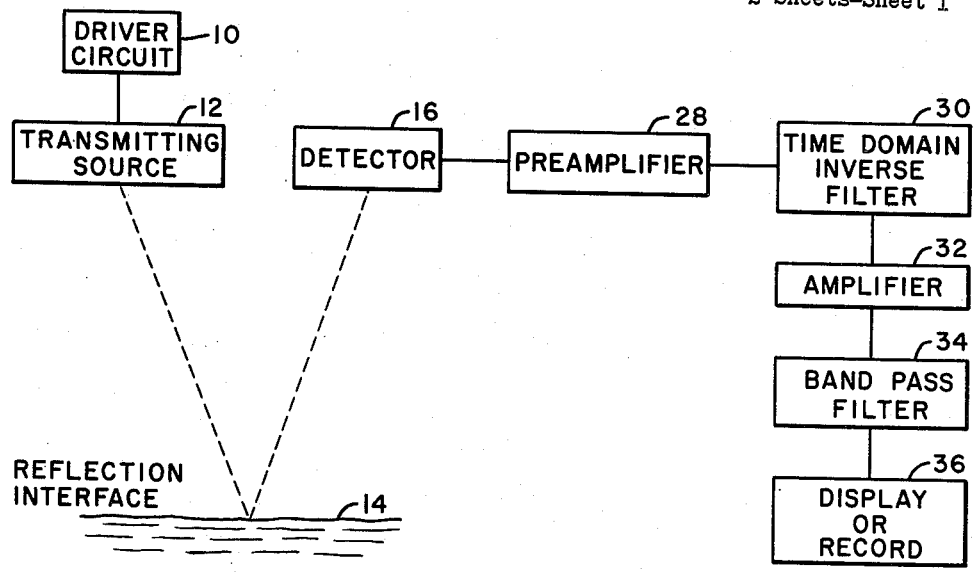
FIG. 1 shows a diagram of the circuit comprising the invention.
Figure 2:
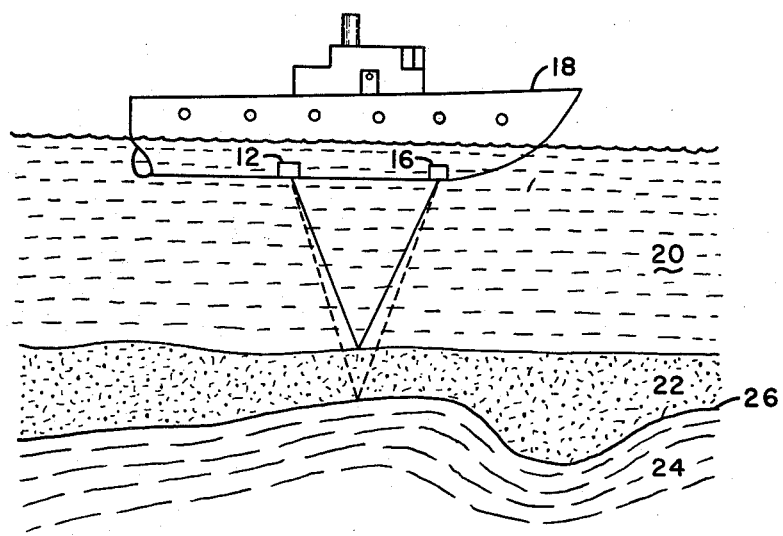
FIG. 2 illustrates beds beneath the bottom of a body of water.

Referring to the drawing, in FIG. 1 in particular, there is shown a driver circuit 10 for energizing and activating transmitting source 12 which transmits energy which is reflected from a reflection interface 14 to detector 16. In FIG. 2 transmitting source 12 and detector 16 are illustrated as being attached to the hull of a ship 18 which is supported by a body of water 20. Under the body of water 20 are illustrated two beds 22 and 24. Bed 22 may be a gas-filled bottom bed of sediments, mud, etc. or it may a hard bed which has a velocity substantially greater than the velocity of sound through water. However, unless otherwise specified in the ensuing description, it will be assumed that bed 22 is a gas-filled layer; that is, bed 22 has free gas contained therein, more or less in the form of bubbles that are not dissolved in bottom bed 22 itself. Bed 24 is directly beneath bed 22 and interface 26 is there between.

It has been found that when the bottom bed of a water-covered area contains gas, neither high frequencies nor low frequencies will appreciably penetrate it. The high frequencies are attenuated and the low frequencies are reflected nearly completely. Thus neither high nor low frequency fathomers can map beds below the bottom of the body of water. However, it has now been found that those low frequencies that do penetrate bottom bed 22 are not attenuated greatly but that low recovery reflections from such beds as 22 and 24 below the bottom of the body of water are hidden in the "ringing" set up by sound bouncing between the surface and the bottom of the water body 20. In the present invention this "ringing" is eliminated.

Figure 3:
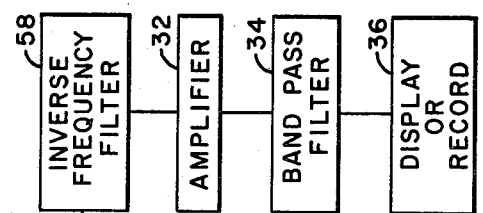
FIG. 3 illustrates a means of obtaining time domain inverse filter.

The reflected signal thus detected by detector 16 is fed to preamplifier 28 where it is amplified prior to being fed to the time domain inverse filter circuit means. Time domain inverse filter circuit means 30 removes the "ringing" of the signal detected by detector 16; a suitable time domain inverse filter is illustrated in FIG. 3 and will be explained in detail hereinafter. The signal from time domain inverse filter 30 is amplified by amplifier 32 and passed through a band pass filter 34. The purpose of the band pass filter 34 is to obtain a signal having frequencies of interest; in normal operations of this invention the frequency range of interest is from about 100 cycles per second to about 1000 cycles per second. The signal thus passed through band pass filter 34 is then displayed or recorded on means 36.

Attention is now directed toward FIG. 3 for a more detailed explanation of a time domain inverse filter. Illustrated thereon is a drum 38 having a reproducible record thereon such as magnetic tape and the like 40. Means are provided for rotating the drum at a constant speed. The signal from preamplifier 28 is fed through recording head 42. Spaced about the periphery from recording head 42 and in the direction of rotation of the drum is read-off head 44. Spaced additionally around the periphery of drum 38 are delay head 46 and an eraser head 48.

Read-off head 44 and delay head 46 are spaced from each other a sufficient distance to compensate for the time $t$ shown in curve $a$ of FIG. 3. $t$ is the time between "ringing modes" D, E, etc. and defined as $$t = \frac{2H}{C_w}$$

in which H is the depth of the water in feet and $C_w$ is the velocity of sound in water in feet per second. The signal from read-off head 44 is passed to amplifier control 50 and a typical signal is illustrated in curve form A. The signal picked up by delay head 46 is passed through an inverter circuit 52 which merely inverts the signal. This inverted signal is then amplified by amplifier 54 and is illustrated in curve B. Since the bottom is not a perfect reflector, E generally is smaller than D and F smaller than E so that amplifier 54 may actually be an atenuator. An analysis of curve A will reveal three rather large arrivals which are quite pronounced and are of magnitudes much greater than the balance of the signal. These are in reality ringing modes of the sound waves bouncing back and forth between the surface and the bottom of the body of water. They are repeated with a regular time separation and are of uniform shape but of slowly diminishing size. A comparison of curve A and B will show that mode $D_1$ is essentially identical to mode D except that it has been inverted and displaced or delayed a period of time equal to $t$. The same relationship exists between mode $E_1$ and E. Curve C illustrates the resulting curve of the addition of curves A and B after the first mode D has passed. It will be observed that these ringing modes cancel each other. In application of this type time domain inverse filter the "ringing" type of interference has been removed without seriously distorting the other arrivals, since the other arrivals are not of the "repeating" type.

If the bottom beds have a velocity of sound greater than that of water, inverter circuit 52 is not used since in this case D and F (every other arrivals) are in the same phase but E (alternate arrival) is inverted with respect to D and F. For processing detected signal from such beds by use of the system shown in FIG. 3, three-way switch 47 is placed in position 2 which bypasses inverter circuit 52.

Figure 4:
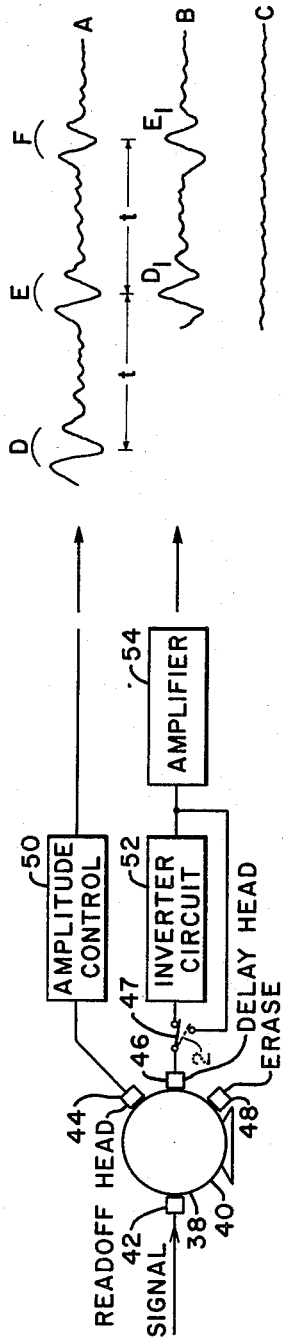
FIG. 4 is similar to FIG. 1 except the time domain inverse filter has been replaced by an inverse frequency filter.

If desired, in place of the time domain inverse filter 30 shown in FIG. 1, an inverse frequency filter 58 may be used as illustrated in the block diagram of FIG. 4. A discussion of the principles of inverse frequency filters is found in the April 1959 issue of Geophysics which has an article by Backus beginning on page 233.

Having described the apparatus of two embodiments of this invention and the basic concept of operation, attention will now be directed toward the selection of a preferred frequency for transmitting source 12. Consideration of desired frequencies will be given to two situations (1) so-called gas-filled bottom beds, that is, when the layer just below the bottom of the body of water contains gas bubbles and (2) where the sublayer just below the bottom of the body of water is hard and has a velocity for sound greater than the velocity of sound in the water.

The reflection coefficient (R) of a plane wave at normal incidence is given by the following formula:

$$R = \frac{\rho_b C_b - \rho_w C_w}{\rho_b C_b + \rho_w C_w} = \frac{Z_b - Z_w}{Z_b + Z_w}$$

in which $\rho_b$ is the density of the material of the bottom bed beneath the body of water; $C_b$ is the velocity of sound in the bottom bed; $\rho_w$ is the density of the water; $C_w$ is the velocity of sound in water; $Z_b$ is the acoustical impedance of the layer beneath the bottom of the body of water and $Z_w$ is the acoustical impedance of the water.

In a gas-filled bottom situation (1), $Z_b$ is much less than $Z_w$; therefore, R approaches $-1$; when R approaches $-1$, it has been found that frequency from transmitting source 12 which is equal to the bubble frequency or greater is absorbed and therefore cannot be detected by detector 16; in other words, the absorption depends upon frequency with very little absorption of the sound from transmitting source 12 being absorbed when its frequency is below the bubble frequency; however, when the frequency is above the bubble frequency, nearly complete absorption of the sound energy occurs. By bubble frequency it is meant the lowest natural frequency of a vibrating bubble of gas within the layer under consideration. $C_b$, the velocity of sound, found in the bottom bed depends on frequency; that is, $C_b$ has a low velocity when the frequency is below the bubble frequency. When the frequency of the sound transmitted from transmitter 12 is above the bubble frequency, $C_b$ is approximately the same as $C_w$, the velocity of sound in water. Hence, for frequencies below the bubble frequency R is approximately $-1$ and nearly complete reflection occurs and for frequencies above the bubble frequency there is little reflection but nearly complete absorption.

It has also been found that the bubble frequency referred to herein is usually about 1,000 cycles per second. It has been seen that in gas-filled layers or bottom beds, the frequency of the sound from transmitting source 12 must be below the bubble frequency so that the energy will not be completely absorbed; however the velocity of sound in the layer beneath the body of water will be well below the velocity of sound in water and strong reflection will occur, giving rise to "ringing."

In the second type bottom bed or sub-layer beneath the body of water to be considered that is, the hard formation, it is seen that $C_b$ is much greater than $C_w$; therefore R approaches 1. In this situation $C_b$ is independent of frequency and little absorption occurs. Therefore, essentially any frequency may be used for hard formations but "ringing" still occurs and can be eliminated as indicated above.

To briefly summarize momentarily it is seen that the frequency of the sound from transmitter source 12 for so-called "gas-filled" bottom beds or sub-layers should be below the bubble frequency of the bubbles in the bottom and the frequency of the sound from transmitting source 12 for "hard sub-layers" may be any desired frequency.

While the invention has been described in terms of the foregoing embodiments and modifications, it will be understood that other modifications will be apparent to those skilled in the art. The scope of the invention should not be considered limited to the details set forth.

I claim:

1. A system for determining the thickness of a bed beneath a body of water in which said bed has gas bubbles therein having a natural frequency $f$ which comprises: sonic vibration means for transmitting energy whose predominate frequencies are less than $f$ downwardly through said body of water; detecting means for detecting and receiving reflected energy, said reflected energy having ringing modes formed by the energy bouncing back and forth between the surface and the bottom of the water; filtering means for removing said ringing modes; and means for displaying the signal from said filtering means.

2. A system as defined in claim 1 in which said filtering means is an inverse frequency filter.

3. A system as defined in claim 1 in which said filtering means is a time domain filter.

4. An apparatus as defined in claim 3 in which said time domain filter includes means for reproducing said detected signal; a second means for reproducing said detected signal delayed a time equal to $$\frac{2H}{C_w}$$

from said first reproduced signal in which H is the depth of the water and $C_w$ is the velocity of sound in water; means to invert said second reproduced signal; and means to add first reproduced signal and said second time delayed inverted reproduced signal.

5. A method of processing reflected energy which has been transmitted downwardly through a body of water overlying a gas-filled bed containing gas bubbles having a natural frequency of $f$ which comprises: transmitting energy having substantially all its frequencies less than $f$ downwardly into the water; detecting at the surface of the water the reflected wave energy which includes ringing modes formed by the energy bouncing back and forth between the surface and the bottom of the water; filtering out said ringing modes; and processing the remaining signal to determine the depth to the bottom of said bed.

6. A system for determining the thickness of a bed beneath a body of water which comprises: means for transmitting energy downwardly through the said body of water; detecting means for receiving energy reflected from said bed; means for reproducing said detected signal; a second means for reproducing said detected signal delayed a time equal to $$\frac{2H}{C_w}$$

from said first reproduced signal in which H is the depth of the water and $C_w$ is the velocity of sound in water; means to invert said second reproduced signal; adding means to add said first reproduced signal and said second time delayed inverted reproduced signal; and means for recording the signal from said adding means.

7. A method for surveying an area having a body of water overlying a bed containing gas bubbles whose resonant frequency is $f$ which comprises:

transmitting energy whose predominate frequencies less than $f$ downwardly through said body of water;

detecting reflected energy;

recording the signal thus detected to obtain a recorded signal;

reproducing the recorded signal to obtain a first reproduced signal;

again reproducing said recorded signal delayed in time equal to $$\frac{2H}{C_w}$$

from the beginning of the first reproduction in which H is the depth of the water and $C_w$ is the velocity of sound in water to obtain a second reproduced signal;

inverting said second reproduced signal;

adding said first reproduced signal and said second reproduced signal to obtain a processed signal; and recording the processed signal.

8. A method for surveying an area having a body of water overlying a bed containing gas bubbles having a natural frequency of $f$ which comprises:

transmitting energy whose predominate frequencies are less than $f$ downwardly;

detecting reflected energy from said transmitted energy which includes ringing modes formed by energy bouncing back and forth between the surface and the bottom of the body of water;

filtering out said ringing modes to obtain a filtered signal; and recording the filtered signal.

References Cited by the Examiner

UNITED STATES PATENTS

| | | | |
|---|---|---|---|
| 2,355,826 | 8/44 | Sharp | 340—15 |
| 2,622,691 | 12/52 | Ording | 340—7 |
| 2,794,965 | 6/57 | Yost | 340—15 |
| 2,916,724 | 12/59 | Peterson | 340—15 |
| 2,940,073 | 6/60 | Spranger et al. | 343—7.3 |
| 2,954,090 | 9/60 | Burg et al. | 340—3 |
| 2,956,261 | 10/60 | Grossling | 340—15 |
| 2,960,176 | 11/60 | Parrack | 340—15 |

OTHER REFERENCES

Milo M. Backus: "Water Reverberations—Their Nature and Elimination," Geophysics, April 1959, pages 233–261.

H. J. Jones et al.: Magnetic Delay Line Filtering Techniques, Geophysics, vol. 20, No. 4, October 1955, pages 745–765.

G. P. Wadsworth et al.: "Detection of Reflections on Seismic Records by Linear Operators," Geophysics, vol. 28, No. 3, July 1953, pages 539–586.

SAMUEL FEINBERG, *Primary Examiner.*

IRVING L. SRAGOW, CHESTER L. JUSTUS,
*Examiners.*